(12) United States Patent
Hartlieb et al.

(10) Patent No.: US 8,004,258 B2
(45) Date of Patent: Aug. 23, 2011

(54) REGULATION OF A CURRENT THROUGH AN INDUCTIVE LOAD

(75) Inventors: Heimo Hartlieb, Graz (AT); Axel Reithofer, Graz (AT); Michael Hausmann, Gleisdorf (AT)

(73) Assignee: Infineon Technologies AG, Neubiberg (DE)

( * ) Notice: Subject to any disclaimer, the term of this patent is extended or adjusted under 35 U.S.C. 154(b) by 174 days.

(21) Appl. No.: 12/192,887

(22) Filed: Aug. 15, 2008

(65) Prior Publication Data

US 2010/0039079 A1 Feb. 18, 2010

(51) Int. Cl.
*G05F 1/00* (2006.01)

(52) U.S. Cl. ...................................... 323/282

(58) Field of Classification Search .................. 323/282, 323/286
See application file for complete search history.

(56) References Cited

U.S. PATENT DOCUMENTS

| | | | |
|---|---|---|---|
| 5,444,592 A * | 8/1995 | Shimizu et al. ................. 361/21 |
| 6,965,222 B2 * | 11/2005 | Yokoyama et al. ........... 323/284 |
| 7,023,717 B2 * | 4/2006 | Nakagawa ....................... 363/95 |
| 7,528,640 B2 * | 5/2009 | Huang et al. .................. 327/172 |
| 2004/0066845 A1 * | 4/2004 | Leith et al. ..................... 375/238 |
| 2005/0179441 A1 * | 8/2005 | Novak et al. ................... 324/522 |
| 2007/0252567 A1 * | 11/2007 | Dearn et al. ................... 323/282 |

* cited by examiner

*Primary Examiner* — Adolf Berhane
*Assistant Examiner* — Jeffrey Gblende
(74) *Attorney, Agent, or Firm* — Slater & Matsil, L.L.P.

(57) ABSTRACT

A current regulator and a method for regulating current are described.

25 Claims, 8 Drawing Sheets

REGULATION OF A CURRENT THROUGH AN INDUCTIVE LOAD

BACKGROUND

The operating point of inductive loads can be set using a current which flows through the load. Inductive loads are, for example, electric motors in which the current flowing through the motor determines the speed of the motor, or solenoid valves in which the current flowing through the load determines a valve position of the valve. Such solenoid valves are used, for example, in automotive engineering in automatic transmissions and are used there to control a hydraulic pressure system.

A current through an inductive load can be regulated by applying a pulse-width-modulated voltage to the load. In this case, the pulse-width-modulated voltage is selected in such a manner that it alternately assumes a first signal level, at which a current through the load rises, and a second signal level, at which a current through the load falls. In this case, an oscillating current whose mean value can be regulated using the duty cycle of the pulse-width-modulated load flows through the load. In the case of a hysteresis regulating method, the pulse-width-modulated voltage is generated in such a manner that it respectively assumes the first signal level when the current has fallen to a lower hysteresis value and respectively assumes the second signal level when the current has risen to an upper hysteresis value. In this method, a frequency of the pulse-width-modulated voltage is dependent on the upper and lower hysteresis values as well as on the upper signal level of the pulse-width-modulated voltage and the inductance of the load.

SUMMARY OF THE INVENTION

A first aspect of the present description relates to a method for regulating a current through at least one inductive load, which method involves: providing a reference clock signal and a reference current signal; applying a pulse-width-modulated supply voltage to the load; providing a current measurement signal which is dependent on a current flowing through the load; the pulse-width-modulated supply voltage being generated on the basis of the reference current signal, the current measurement signal and a phase difference signal which represents a phase difference between the reference clock signal and the pulse-width-modulated supply voltage.

A second aspect relates to a current regulator having: connecting terminals for connecting a load; a first input terminal for supplying a reference clock signal and a second input terminal for supplying a reference current signal; a controllable voltage source having load connecting terminals, which are connected to the connecting terminals, and a control input; a current measuring arrangement which is designed to provide a current measurement signal which is dependent on a current flowing between the connecting terminals; a pulse width modulator arrangement which is designed to generate a pulse-width-modulated drive signal for the control input of the controllable voltage source; a phase discriminator arrangement which is supplied with the reference clock signal and the pulse-width-modulated signal and is designed to provide a phase difference signal which is dependent on a phase difference between the reference clock signal and the pulse-width-modulated drive signal, the pulse width modulator arrangement being designed to drive the pulse-width-modulated signal on the basis of this phase difference signal, the reference current signal and the current measurement signal.

A third aspect relates to a current regulator having: connecting terminals for connecting a load; a first input terminal for supplying a reference clock signal and a second input terminal for supplying a reference current signal; a controllable voltage source having load connecting terminals, which are connected to the connecting terminals, and a control input; a current measuring arrangement which is designed to provide a current measurement signal which is dependent on a current flowing between the connecting terminals; a pulse width modulator arrangement which is designed to generate a pulse-width-modulated drive signal for the control input of the controllable voltage source; a phase discriminator arrangement which is supplied with the reference clock signal and the pulse-width-modulated signal and is designed to provide a phase difference signal which is dependent on a phase difference between the reference clock signal and the pulse-width-modulated drive signal, the pulse width modulator arrangement being designed to generate the pulse-width-modulated signal in such a manner that it assumes a first signal level when the current measurement signal reaches a first hysteresis value and assumes a second signal level when the current measurement signal reaches a second hysteresis value, the first and second hysteresis values being dependent on the phase difference signal.

A fourth aspect relates to a current regulator having: connecting terminals for connecting a load; a first input terminal for supplying a reference clock signal and a second input terminal for supplying a reference current signal; a controllable voltage source having load connecting terminals, which are connected to the connecting terminals, and a control input; a current measuring arrangement which is designed to provide a current measurement signal which is dependent on a current flowing between the connecting terminals; a pulse width modulator arrangement which is designed to generate a pulse-width-modulated drive signal for the control input of the controllable voltage source; a phase discriminator arrangement which is supplied with the reference clock signal and the pulse-width-modulated signal and is designed to provide a phase difference signal which is dependent on a phase difference between the reference clock signal and the pulse-width-modulated drive signal, the pulse width modulator arrangement being designed to generate the pulse-width-modulated signal in such a manner that it assumes a first signal level when a difference between the time integral of the current measurement signal and the time integral of the reference current signal reaches a predefined value and it retains the first signal level for a period of time which is dependent on the phase difference signal.

BRIEF DESCRIPTION OF THE DRAWINGS

Examples are explained below with reference to the figures. The emphasis is on the explanation of the basic principles in this case. Therefore, only the parts and signals needed to understand these basic principles are illustrated in the figures. In the figures, unless specified otherwise, the same reference symbols denote the same parts with the same meaning.

FIGS. 4A and 4B, collectively FIG. 4, illustrate temporal profiles of signals occurring in the current regulator when a hysteresis regulating method is used;

FIGS. 5A and 5B, collectively FIG. 5, illustrate temporal profiles of signals occurring in the current regulator when an integrating regulating method is used;

FIGS. 6A to 6C, collectively FIG. 6, illustrate signal profiles in an integrating regulating method in detail;

DETAILED DESCRIPTION OF ILLUSTRATIVE EMBODIMENTS

Figure 1:
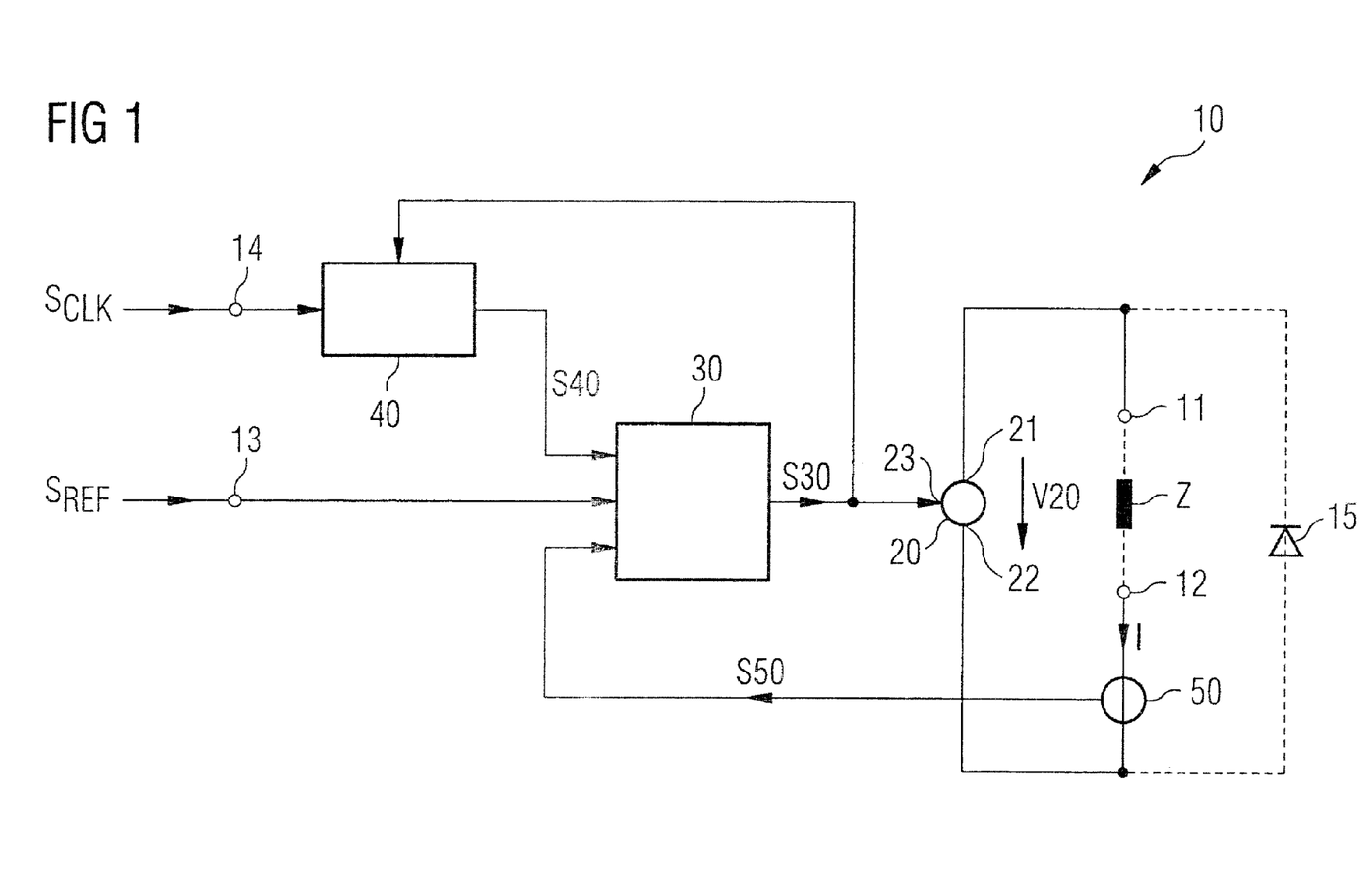
FIG. 1 uses a block diagram to illustrate an example of a current regulator having a controllable voltage source, a current measuring arrangement, a pulse width modulator arrangement and a phase discriminator arrangement.

FIG. 1 shows a block diagram of an example of a current regulator. This current regulator has load connecting terminals 11, 12 for connecting a load Z (illustrated using dashed lines). The load Z is, in particular, an inductive load, an "inductive load" being understood below as meaning any desired inductance-exhibiting load, that is to say a load having an inductive load component.

The current regulator 10 also has a controllable voltage source 20 having load connecting terminals 21, 22 and a control input 23. A first one 21 of the load connecting terminals is connected to a first one 11 of the load connecting terminals of the current regulator 10, and a second one 22 of the load connecting terminals of the controllable voltage source 20 is connected to a second one 12 of the load connecting terminals of the current regulator 10. The voltage source 20 is designed to provide a pulse-width-modulated voltage V20 for the load Z present between the load connecting terminals 11, 12 during operation of the current regulator 10 in accordance with a pulse-width-modulated drive signal S30 which is supplied to a control input 23. In accordance with the pulse-width-modulated drive signal S30, this pulse-width-modulated voltage V20 has a first or a second signal level. For the explanation below, it shall be assumed that the first signal level is, for example, a voltage level having a level value not equal to zero and that the second signal level is, for example, a voltage level having a level value of zero. In this case, a current which rises over time flows through the load Z when the pulse-width-modulated voltage V20 assumes the first signal level, and a current which falls over time flows through the load Z when the pulse-width-modulated voltage V20 assumes the second signal level.

Figure 2:
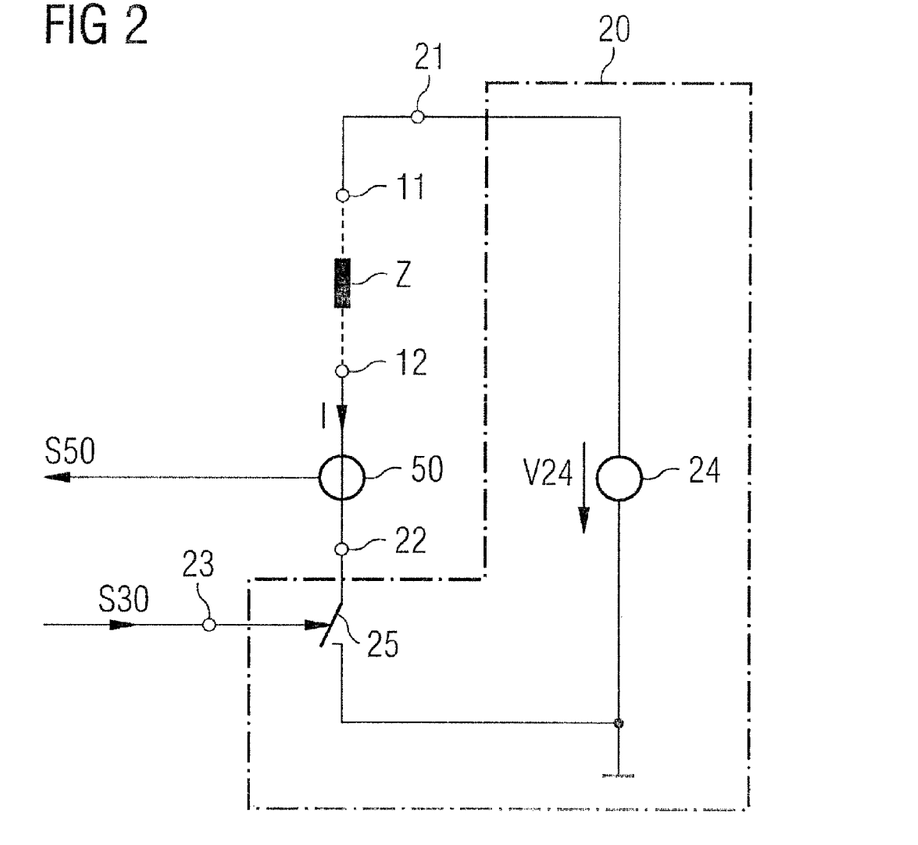
FIG. 2 shows an example of a controllable voltage source.

With reference to FIG. 2, the controllable voltage source 20 comprises, for example, a DC voltage source 24 and a switching element 25 which is connected in series with the DC voltage source 24. In this case, the series circuit comprising the DC voltage source 24 and the switching element 25 is connected between the load connecting terminals 11, 12 of the current regulator 10 and thus in parallel with the load Z. The DC voltage source 24 is, for example, a battery, such as a vehicle battery of a motor vehicle. This DC voltage source 24 provides a DC voltage V24 which, when the switching element 25 is turned on, is applied between the load connecting terminals 11, 12 of the current regulator 10 and thus across the load Z. When the switching element 25 is turned off, the DC voltage V24 is applied across the switching element 25, with the result that the voltage across the load Z is zero. A first signal level of the pulse-width-modulated voltage corresponds in this case to the value of the voltage V24 provided by the DC voltage source 24, whereas a second signal level of the pulse-width-modulated voltage V20 is zero. It shall be pointed out that FIG. 2 shows only one possible example of an implementation of the controllable voltage source 20, which is used for better understanding, but that any desired controllable voltage sources may be used.

The current regulator 10 also has a current measuring arrangement 50 which is designed to record a current I flowing through the load Z during operation of the current regulator 10 and to provide a current measurement signal S50 which is dependent on this current I. This current measurement signal S50 is, for example, proportional to the current I flowing through the load but may also be related to the load current I in another manner. For example, the current measurement signal may thus have a signal component which is proportional to the load current and an offset component.

Figure 3:
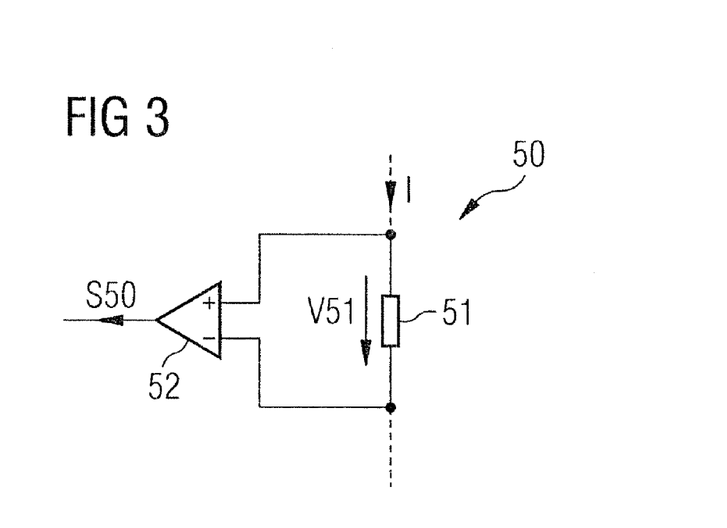
FIG. 3 shows an example of a current measuring arrangement.

With reference to FIG. 3, the current measuring arrangement 50 has, for example, a current measuring resistor 51 (shunt resistor) which is connected in series with the load during operation of the current regulator 10 and across which the load current I gives rise to a voltage drop V51. The current measuring arrangement 50 according to FIG. 3 also has a measuring amplifier 52 which taps off the voltage V51 applied across the measuring resistor 51 and provides the current measurement signal S50 which is dependent on this voltage V51 and is proportional to this voltage V51, for example.

In the example illustrated in FIG. 1, the current measuring arrangement 50 is connected between one of the load connecting terminals of the current regulator 10 and the controllable voltage source 20. In this context, it shall be pointed out that the current measuring arrangement 50 can be connected between any desired one of the two load connecting terminals 11, 12 of the current regulator 10 and the controllable voltage source 20. In addition, the current I through the load Z may be recorded in any desired manner other than using a shunt resistor. For example, it is thus possible to implement the switching element 25 of the controllable voltage source 20 as a MOS transistor whose drain and source connections form the load path connections and whose gate connection forms the control connection and to record the load current I in accordance with the so-called current sense principle. In this case, in a manner which is known in principle, provision is made of a MOS transistor which is connected in parallel with the MOS transistor used as a switching element and is operated at the same operating point. In this case, a current flowing through this "measuring transistor" is proportional to the current flowing through the MOS transistor which is used as a switching element. This current flowing through the measuring transistor can then be recorded using a measuring resistor and a measuring amplifier in accordance with FIG. 3.

With reference to FIG. 1, a freewheeling element 15, for example, a diode which is connected in such a manner that it enables a freewheeling current through the inductive load Z when the signal level of the pulse-width-modulated voltage V20 corresponds to the second signal level or zero, is optionally provided. In this case, the freewheeling element 15 is, for example, connected in parallel with a series circuit comprising the load Z and the current measuring arrangement 50.

With reference to FIG. 1, the current regulator 10 also has a first input terminal 13 for supplying a current reference signal $S_{REF}$. This current reference signal $S_{REF}$ is used as a desired variable for setting a current I which flows through the load Z. This current reference signal $S_{REF}$ is supplied to a pulse width modulator arrangement 30 which generates the pulse-width-modulated drive signal S30. Apart from the current reference signal $S_{REF}$, the pulse width modulator arrangement 30 is supplied with the current measurement signal S50 and a phase difference signal S40. The phase difference signal S40 is available at the output of a phase discriminator arrangement 40 which is supplied with a reference clock signal $S_{CLK}$ via a second input terminal 14 of the current regulator 10 and is also supplied with the pulse-width-modulated drive signal S30. The phase discriminator arrangement 40 is designed to generate the phase difference signal S40 in such a manner that it is dependent on an instantaneous phase deviation or frequency deviation, and/or a phase deviation or frequency deviation in the past, between the reference clock signal $S_{CLK}$ and the pulse-width-modulated drive signal S30. The common term "phase deviation" is used below for "frequency or phase deviation"; in connection with the explanation below, there is thus also a phase deviation when the reference clock signal $S_{CLK}$ and the pulse-width-modulated drive signal S30 differ in terms of their frequencies.

In the current regulator 10 illustrated, the pulse width modulator arrangement 30 is designed to generate the pulse-width-modulated drive signal S30 on the basis of the current reference signal $S_{REF}$, the current measurement signal S50 and the phase difference signal S40 in such a manner that a mean value of the current I flowing through the load is dependent on the current reference signal $S_{REF}$ and the pulse-width-modulated drive signal S30 is in phase with the reference clock signal $S_{CLK}$. Generating the pulse-width-modulated drive signal S30 in such a manner that it is in phase with the reference clock signal $S_{CLK}$ is helpful with regard to influencing electromagnetic interference radiation which emanates from a switching current regulator. In this context, a "switching current regulator" is a current regulator in which a voltage applied via a load is switched hard between two voltage levels, as is the case when the explained pulse-width-modulated voltage is applied to the load.

In this case, the frequency at which such electromagnetic interference pulses are generated by the current regulator can be set using the reference clock signal. This is expedient, in particular, when a plurality of current regulators of the type illustrated in FIG. 1 are simultaneously operated in a single circuit. In this case, reference clock signals which are phase-shifted with respect to one another may be supplied to the individual current regulators, as a result of which the switching times, that is to say the times at which a switch is made from one voltage level to the other voltage level in the individual current regulators, are phase-shifted with respect to one another, thus resulting overall in a reduction in the electromagnetic interference radiation. In addition, the power density spectrum of the interference radiation may be measured or determined in a simple manner if the frequency at which the individual interference pulses are generated is known. If this power density spectrum is known, simple and thus cost-effective filters can be used to filter such electromagnetic interference radiation.

The current regulator 10 according to FIG. 1 has two control loops: a first control loop which is used to regulate the current I flowing through the load Z, comprises the current measuring arrangement 50 and the pulse width modulator arrangement 30, and contains the current reference signal $S_{REF}$ as the desired variable and the current measurement signal S50 as the controlled variable; a second control loop which comprises the phase discriminator 40 and the pulse width modulator arrangement 30 and contains the reference clock signal $S_{CLK}$ as the desired variable and the pulse-width-modulated drive signal S30 as the controlled variable.

Figure 4A:
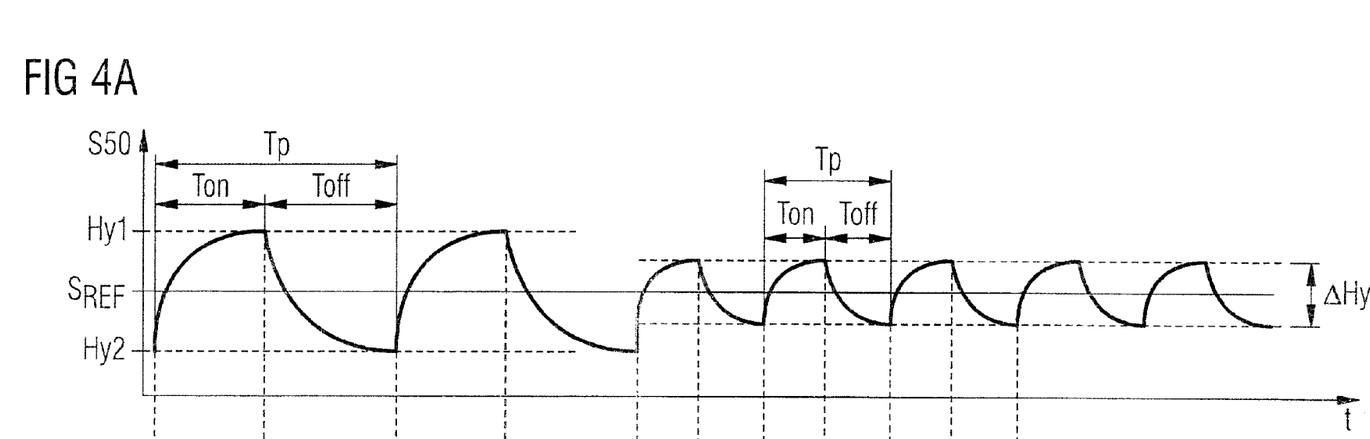
Figure 4B:
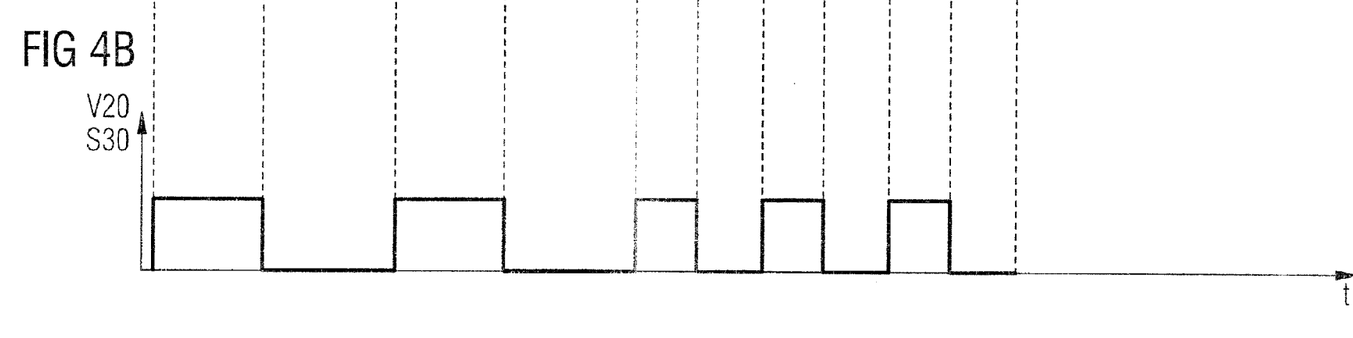
Figure 5A:
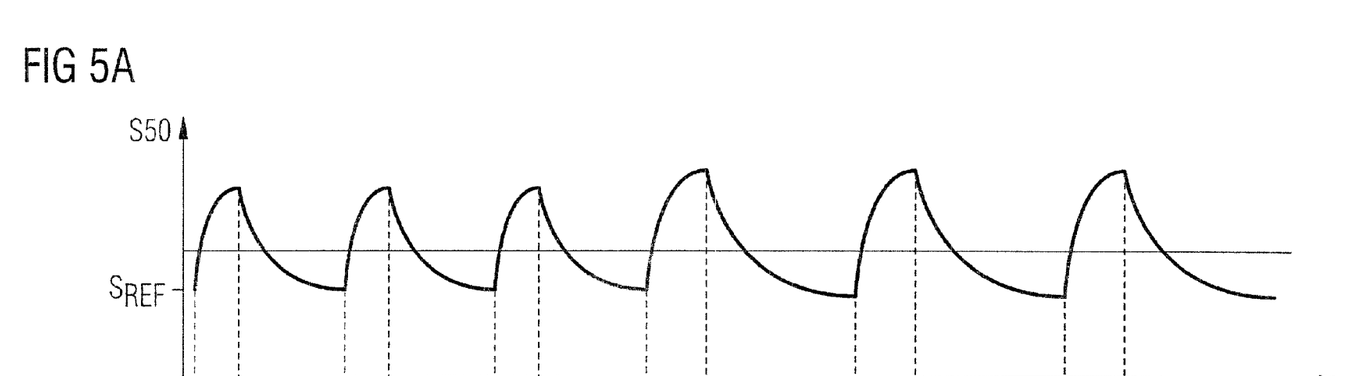
Figure 5B:
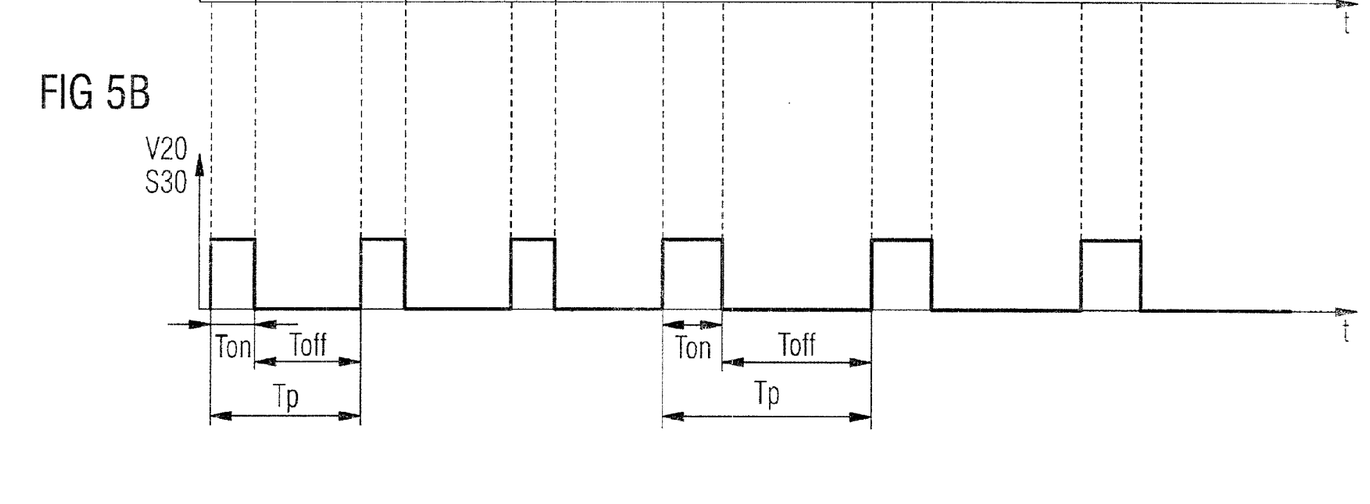

For the sake of better understanding, two different regulating methods, which can be used to regulate a current through an inductive load, shall first of all be explained below using FIGS. 4 and 5, namely a hysteresis regulating method (FIG. 4) and an integrating regulating method (FIG. 5).

With reference to FIG. 4, in the case of a hysteresis regulating method, the current measurement signal S50 representing the load current I is compared with a first hysteresis value Hy1 and a second hysteresis value Hy2, which are also referred to below as the upper and lower hysteresis values Hy1, Hy2, and the pulse-width-modulated voltage V20 and the pulse-width-modulated drive signal S30 are generated on the basis of the comparison result. FIG. 4A illustrates the temporal profile of the current measurement signal S50, which represents the load current I, in the case of such a hysteresis regulating method. In the case of such a method, the pulse-width-modulated voltage V20 is generated, for example, in such a manner that it assumes the upper signal level when the current measurement signal S50 has fallen to the lower hysteresis value Hy2. The load current I, and thus the current measurement signal S50, rise as a result. In this case, the upper signal level of the pulse-width-modulated voltage V20 is retained until the current measurement signal S50 has risen to the upper hysteresis value Hy1. At this time, the pulse-width-modulated voltage V20 changes to the second signal level, as a result of which the current I, and thus the current measurement signal S50, fall. A drive cycle or switching cycle then begins again when the current measurement signal S50 has fallen to the lower hysteresis value Hy2.

FIG. 4B illustrates the temporal profile of the pulse-width-modulated voltage V20 which corresponds to the temporal profile of the current measurement signal S50 in FIG. 4A. The temporal profile of the pulse-width-modulated voltage V20 is determined by the temporal profile of the pulse-width-modulated drive signal S30 whose temporal profile is likewise illustrated in FIG. 4B. It shall be noted in this context that the amplitudes of the pulse-width-modulated voltage V20 and of the pulse-width-modulated drive signal S30 naturally differ but that these signals have been illustrated with the same amplitudes in FIG. 4B for the purpose of simplifying the illustration. It is also assumed, for the illustration in FIG. 4B, that the pulse-width-modulated voltage V20 respectively assumes a first or upper signal level when the pulse-width-modulated drive signal assumes an upper signal level (high level) and that the pulse-width-modulated voltage V20 respectively assumes a second or lower signal level when the pulse-width-modulated drive signal S30 assumes a lower signal level (low level). It goes without saying that the pulse-width-modulated voltage could also be generated in such a manner that its temporal profile is complementary to the temporal profile of the pulse-width-modulated drive signal, that is to say it assumes an upper signal level when the drive signal S30 assumes a lower signal level and vice versa.

The period of time during which the pulse-width-modulated voltage V20 assumes the upper signal level is referred to below as the on duration Ton, and the period of time during which the pulse-width-modulated voltage V20 assumes the lower signal level is referred to below as the off duration Toff. A drive cycle of the load Z comprises an on duration Ton and a following off duration Toff; in this case, a duration Tp of a drive cycle, also referred to as the cycle duration below, corresponds to the sum of the on duration Ton and off duration Toff. A frequency $f_{S30}$ of the pulse-width-modulated drive signal S30 corresponds in this case to the reciprocal of the cycle duration Tp, that is to say: $f_{S30}=1/Tp$.

In the case of a hysteresis regulating method, the upper and lower hysteresis values Hy1, Hy2 are selected, for example, in such a manner that they are symmetrical around the reference current value $S_{REF}$ or the current reference value $S_{REF}$ is in the middle between the upper and lower hysteresis values Hy1, Hy2. The following thus applies:

$$Hy1 = S_{REF} + \frac{1}{2} \cdot \Delta Hy, \quad (1a)$$

$$Hy2 = S_{REF} + \frac{1}{2} \cdot \Delta Hy. \quad (1b)$$

In this case, $\Delta Hy$ denotes the so-called hysteresis interval, to which the following applies:

$$\Delta Hy = |Hy1 - Hy2| \quad (2).$$

In the case of such a regulating method, the load current I oscillates around a value which is dependent on the current reference value $S_{REF}$. In this case, the current value around which the load current I oscillates need not necessarily correspond to the mean value of the current I flowing through the load, namely when the current profile is not a triangular current profile but rather, as in the example illustrated, an exponential current profile. Such an exponential current profile is present, in particular, when the current flowing through the load is so large that the load is magnetized as far as its range of saturation. Although the mean value of the load current I in this case is not directly proportional to the reference current signal $S_{REF}$, the mean value of the load current I can nevertheless be regulated using the current reference signal $S_{REF}$. The mean value of the load current thus rises, for example, when the reference current signal $S_{REF}$ becomes greater, and the mean value of the load current decreases when the reference current signal $S_{REF}$ becomes smaller. In the case of such a hysteresis regulating method, the frequency $f_{S30}$ of the pulse-width-modulated drive signal S30 is dependent on the hysteresis interval $\Delta Hy$, the frequency being higher the smaller this hysteresis interval $\Delta Hy$. The frequency $f_{S30}$ of the pulse-width-modulated drive signal S30 is also dependent on the upper signal level of the pulse-width-modulated voltage V20 and on the inductance value of the load. In this case, for a given hysteresis interval $\Delta Hy$ and a given inductance of the load Z, the frequency is higher the greater the upper signal level of the voltage V20 since the current rises more quickly inside the on duration Ton the greater the voltage applied across the load Z. In addition, for a given hysteresis interval $\Delta Hy$ and a given upper signal level, the frequency $f_{S30}$ is lower the greater the inductance of the load since the current rises more slowly inside the on duration Ton the greater the inductance value of the load Z, that is to say the more slowly the load is magnetized for a given voltage.

The dependence of the frequency $f_{S30}$ of the pulse-width-modulated drive signal S30 on the hysteresis interval $\Delta Hy$ can be seen from FIGS. 4A and 4B which illustrate the current measurement signal S50 and the pulse-width-modulated drive signal for two different hysteresis intervals: a first, larger hysteresis interval in the left-hand part of FIG. 4A; and a second, smaller hysteresis interval in the right-hand part of FIG. 4A.

FIG. 5 illustrates temporal profiles of the current measurement signal S50, the pulse-width-modulated voltage V20 and the pulse-width-modulated drive signal S30 for another possible regulating method. In this method, the on duration Ton is permanently predefined and respectively begins when an on condition is reached. Like in the hysteresis regulating method explained above, the load current rises during the on duration and falls again during the subsequent off duration Toff until an on condition is reached again. FIG. 5 illustrates the temporal profile of the signals for two different on durations Ton: a first, shorter on duration in the left-hand part of FIG. 5A; and a second, longer on duration in the right-hand part of FIG. 5A. It can be seen from FIG. 5 that the frequency $f_{S30}$ of the pulse-width-modulated drive signal S30 and of the pulse-width-modulated voltage V20 is dependent on the on duration Ton, the frequency $f_{S30}$ being lower the longer the on duration Ton. For a given on duration Ton, the frequency $f_{S30}$ is higher the higher the first signal level of the pulse-width-modulated voltage V20, and the frequency $f_{S30}$ is lower for a given upper signal level and for a given on duration the greater the inductance value of the load Z.

Figure 6A:
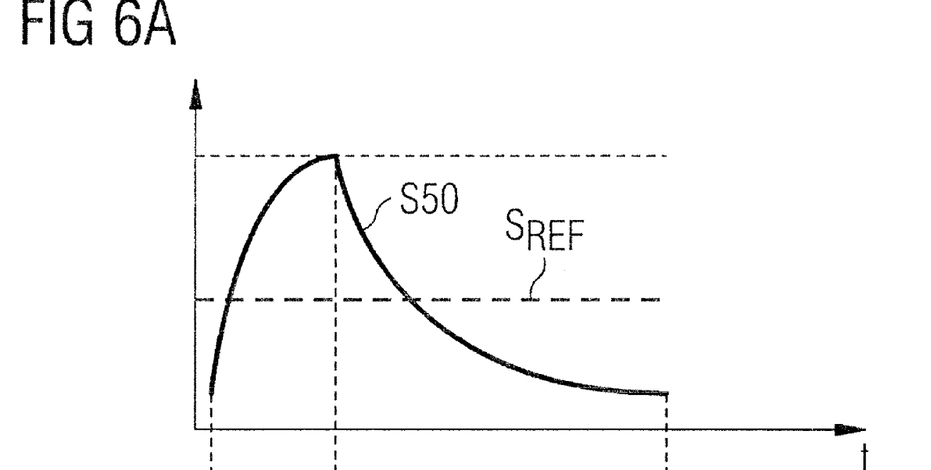
Figure 6B:
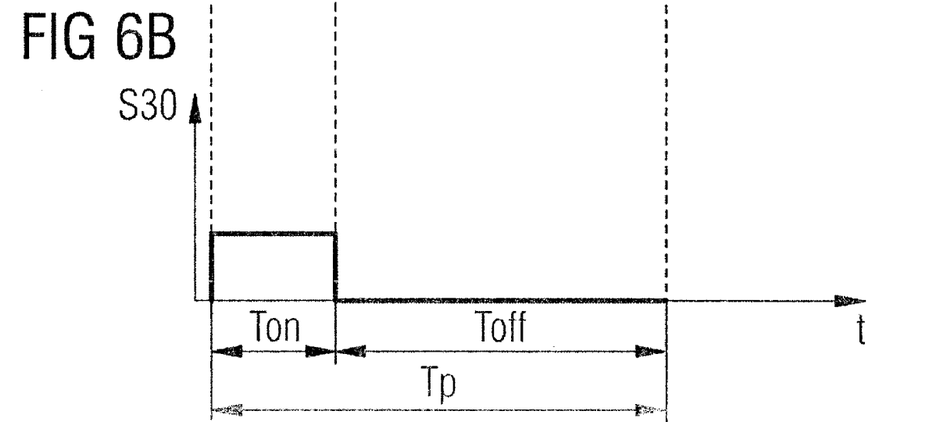
Figure 6C:
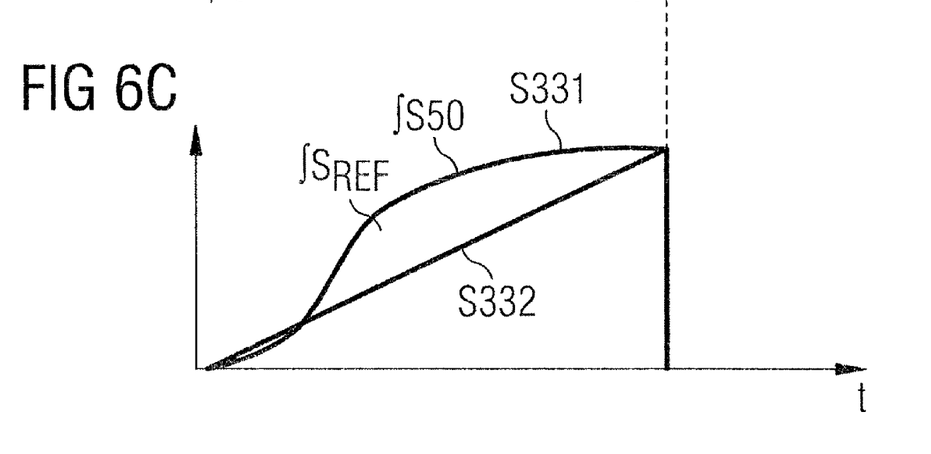

With reference to FIG. 6, in one example for determining an on condition, provision is made for the current measurement signal S50 and the reference current signal $S_{REF}$ to be integrated. In this case, an on condition, that is to say a condition in which the pulse-width-modulated voltage V20 assumes the upper signal level, is respectively reached when the time integral of the current measurement signal S50 reaches the value of the time integral of the reference current signal $S_{REF}$ during the off duration. For the purpose of illustration, FIG. 6 illustrates temporal profiles of the current measurement signal S50 and the reference current signal $S_{REF}$ (FIG. 6A), the pulse-width-modulated drive signal S30 (FIG. 6B) and the time integrals of the reference current signal $S_{REF}$ and of the current measurement signal S50 (FIG. 6C). The reference current signal $S_{REF}$ and the current measurement signal S50 can be integrated over a plurality of drive cycles. However, with reference to FIG. 6C, it is also possible to respectively start integration of the two signals $S_{REF}$, S30 at the beginning of an on duration Ton at zero or another predefined value.

A method in which time integrals of the reference current signal $S_{REF}$ and of the current measurement signal S50 are evaluated in order to determine an on condition is referred to below as an integrating regulating method. In the case of such a regulating method, the current measurement signal S50 oscillates around the reference current signal $S_{REF}$. In this method, the reference current signal $S_{REF}$ directly determines the mean value of the load current I flowing through the load Z.

Instead of comparing the time integrals of the current measurement signal S50 and of the reference current signal $S_{REF}$ with one another in order to determine an on condition, it is also possible, in a manner which is not illustrated in any more detail, to determine a difference between the current measurement signal S50 and the reference current signal $S_{REF}$, to integrate this difference signal over time and to compare the time integral obtained thereby with a threshold value, for example, zero. In this method, an on condition is reached whenever the time integral of the difference signal reaches the threshold value during an off duration Toff.

Figure 7:
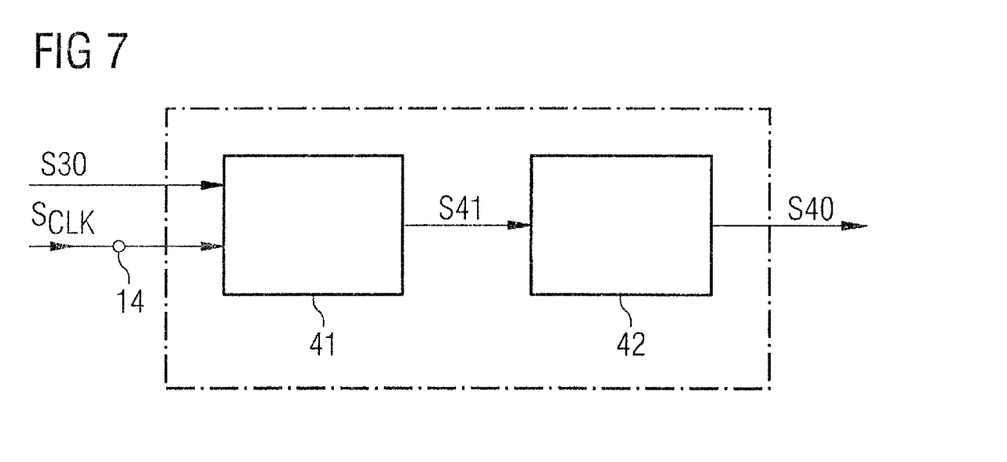
FIG. 7 shows a block diagram of an example of a phase discriminator arrangement having a phase discriminator and a filter connected downstream of the phase discriminator.

With reference to FIG. 7, the phase discriminator arrangement has, for example, a phase discriminator 41 and a filter 42 connected downstream of the phase discriminator 41. The phase discriminator 41 is supplied with the reference clock signal $S_{CLK}$ and the pulse-width-modulated drive signal S30. The phase discriminator 41 is designed to generate an output signal S41 which is dependent on an instantaneous phase difference between the pulse-width-modulated drive signal S30 and the reference clock signal $S_{CLK}$. The output signal S41 is supplied to a filter 42 which provides the phase difference signal. The filter 42 is an integral filter (I filter) or a proportional-integral filter (PI filter). The phase difference signal S40 thus has a signal component which is dependent on a time integral of the output signal S41 of the phase discriminator 41 which represents the instantaneous phase difference.

Figure 8:
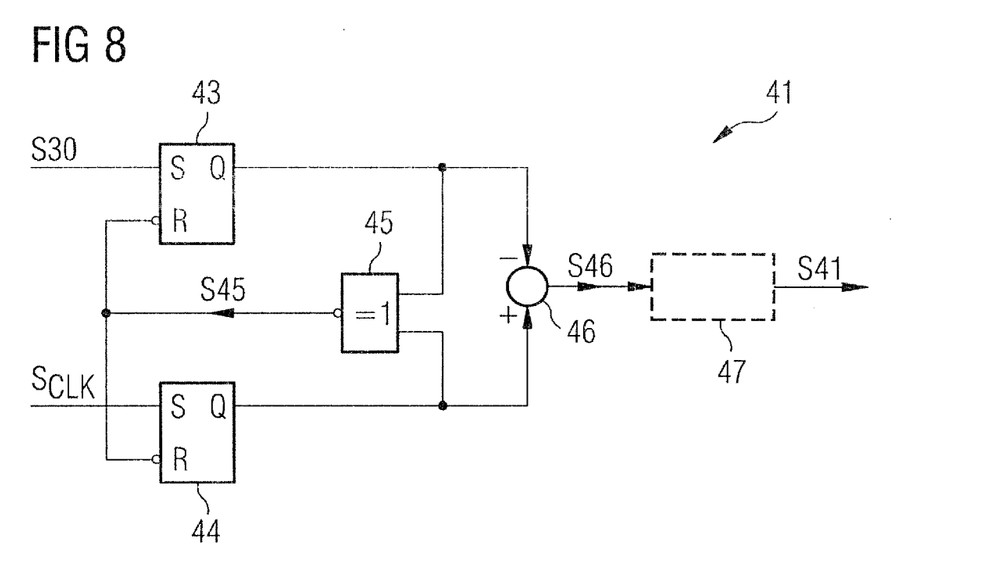
FIG. 8 shows a block diagram of an example of a phase discriminator.

FIG. 8 shows a block diagram of an example of the phase discriminator 41. This phase discriminator 41 has a first flip-flop 43 having a set input S and a reset input R, the set input of which is supplied with the pulse-width-modulated drive signal S30. The phase discriminator 41 also has a second flip-flop 44 having a set input S and a reset input R, the set input of which is supplied with the reference clock signal $S_{CLK}$. Output signals which are available at non-inverting outputs Q of the flip-flops 43, 44 are supplied, on the one hand, to a logic gate 45 and, on the other hand, to a subtractor 46. In the example illustrated, the logic gate 45 is a NAND gate which uses the flip-flop output signals to generate a logic signal S45 which is supplied to the reset inputs R of the flip-flops 43, 44. These reset inputs are inverting inputs in the example illustrated; the flip-flops 43, 44 are thus respectively reset upon falling edges of the output signal S45 of the NAND gate 45. In the example illustrated, the subtractor 46 subtracts the output signal of the first flip-flop 43 from the output signal of the second flip-flop 44 and provides a difference signal S46. In this context, it shall be pointed out that the subtractor 46 could also be designed to subtract the output signal of the second flip-flop 44 from the output signal of the first flip-flop 43 without fundamentally changing the method of operation of the phase discriminator. Although the two flip-flops 43, 44 are in the form of RS-type flip-flops in the example illustrated, it goes without saying that any desired other flip-flops which can be set and reset, for example, D-type flip-flops, could be used.

The difference signal S46 available at the output of the subtractor 46 may be supplied to an optional filter 47, for example, a low-pass filter, which uses the difference signal S46 to generate the output signal S41 of the phase discriminator 41.

Figure 9:
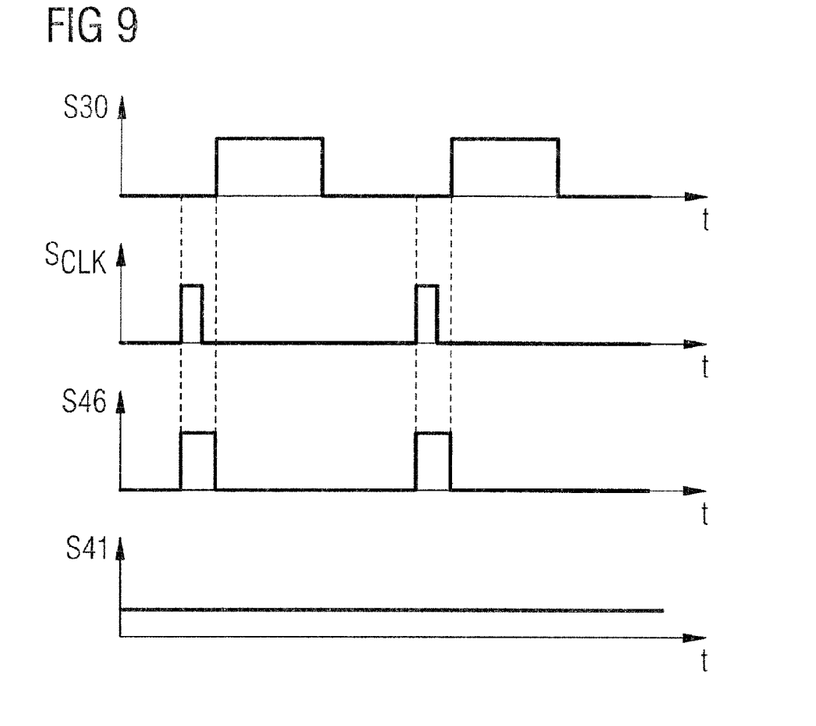
FIG. 9 uses temporal signal profiles to illustrate the operation of the phase discriminator according to FIG. 8.

The method of operation of the example of a phase discriminator 41, which was explained using FIG. 8, becomes clear from examples of temporal profiles of the pulse-width-modulated drive signal S30, the reference clock signal $S_{CLK}$ and the difference signal S46, which are illustrated in FIG. 9. The phase discriminator illustrated generates, as the difference signal S46, signal pulses having a duration which corresponds to a temporal offset between a rising edge of the reference clock signal $S_{CLK}$ and a rising edge of the pulse-width-modulated drive signal S30. The time duration of a signal pulse of the difference signal S46 thus corresponds to an instantaneous phase difference between the reference clock signal $S_{CLK}$ and the pulse-width-modulated drive signal S30. The signal pulses of the difference signal S46 have a positive or negative amplitude, to be precise depending on which of the two flip-flops 43, 44 is set first by a rising edge of the respectively supplied signal S30 or $S_{CLK}$. In the example illustrated, the second flip-flop 44 is set first, to be precise at the time t1, by a rising edge of the reference clock signal $S_{CLK}$. A rising edge of the pulse-width-modulated drive signal S30 occurs at a later time t2. The first flip-flop 43 is set at this time; however, immediately after the first flip-flop 43 has been set, both flip-flops 43, 44 are reset via the NAND gate 45. A delay duration between the setting of the first flip-flop 43 and the resetting of both flip-flops 43, 44 is only dependent in this case on gate transit times of the first flip-flop 43 and the NAND gate 45. The difference signal S46 which corresponds to the difference between the output signals of the second and first flip-flops 44, 43 is, in this case, a signal pulse which has a positive amplitude, extends from the first time t1 to the second time t2 and whose duration thus corresponds to the temporal offset between the rising edge of the reference clock signal $S_{CLK}$ and a rising edge of the pulse-width-modulated drive signal S30. If the rising edge of the pulse-width-modulated drive signal S30 were generated, in terms of time, before the rising edge of the reference clock signal $S_{CLK}$, the signal pulse of the difference signal S46 would be a negative signal pulse having a duration corresponding to a temporal offset between the rising edges of the pulse-width-modulated drive signal S30 and the reference clock signal $S_{CLK}$. The optional filter 47 is used to average the signal pulses of the difference signal S46. The filter constant of the low-pass filter 47 is short in this case in comparison with the period of time over which the filter 42 integrates the output signal S41 of the phase discriminator 41. In this context, it shall be noted that the low-pass filter 47 may be omitted, in particular, when a filter 42 which is connected downstream of the phase discriminator 41 and has an integrating filter response is provided. A phase discriminator, as explained using FIGS. 8 and 9, is known in principle, with the result that it is possible to dispense with further statements with respect to it. In this context, it shall be noted that such a phase discriminator also functions when the two signals supplied to it, the reference clock signal $S_{CLK}$ and the pulse-width-modulated drive signal S30 in the example illustrated, have not only a phase difference but also different frequencies.

Figure 10:
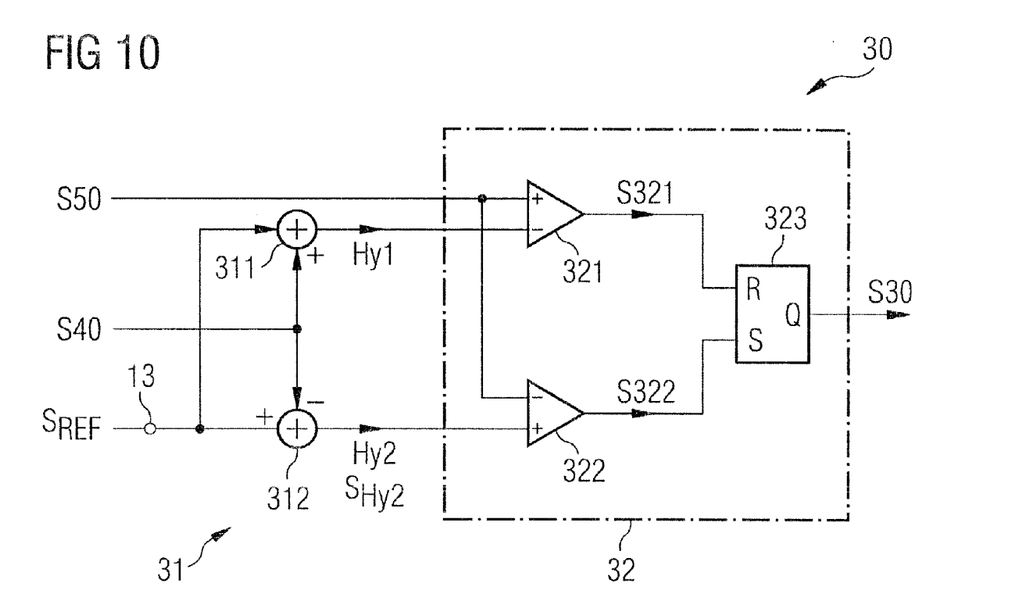
FIG. 10 shows a first example of a pulse width modulator arrangement.

FIG. 10 shows a block diagram of an example of a pulse width modulator arrangement which is designed to generate a pulse-width-modulated drive signal S30 on the basis of the current reference signal $S_{REF}$, the phase difference signal S40 and the current measurement signal S50. The pulse width modulator arrangement 30 illustrated has a hysteresis interval unit 31 and a pulse width modulator 32. The hysteresis interval unit 31 is designed to generate a first and a second hysteresis value Hy1, Hy2 on the basis of the current reference signal $S_{REF}$ and the phase difference signal S40. These hysteresis interval values Hy1, Hy2 and the current measurement signal S50 are supplied to the pulse width modulator 32 which generates the pulse-width-modulated drive signal S30 in a manner which has already been explained in principle using FIG. 4. For this purpose, the pulse width modulator 32 illustrated has a first and a second comparator 321, 322 and a flip-flop 323. The current measurement signal S50 is supplied to a non-inverting input, and the first hysteresis value Hy1 is supplied to an inverting input, of the first comparator 321 and the current measurement signal S50 is supplied to an inverting input, and the second hysteresis value Hy2 is supplied to a non-inverting input, of the second comparator 322. An output signal S321 of the first comparator 321 is supplied to a reset input R of the flip-flop 323, and an output signal S322 of the second comparator 322 is supplied to a set input of the flip-flop 323. In the example illustrated, the pulse-width-modulated drive signal S30 is available at a non-inverting output Q of the flip-flop 323. In the case of the pulse width modulator 32 illustrated, the flip-flop 323 is respectively set when the current measurement signal S50 has fallen to the value of the second or lower hysteresis value Hy2, as a result of which the pulse-width-modulated drive signal S30 assumes an upper signal level or high level. Resetting of the flip-flop 323 in order to generate a low level of the pulse-width-modulated drive signal S30 is respectively carried out when the current measurement signal S50 has risen to the upper hysteresis value Hy1.

In the example illustrated, the upper hysteresis value Hy1 corresponds to a sum of the current reference signal $S_{REF}$ and the phase difference signal S40 and is available at the output of an adder 311 which is supplied with the current reference signal $S_{REF}$ and the phase difference signal S40. In the example illustrated, the second hysteresis value Hy2 corresponds to the difference between the current reference signal $S_{REF}$ and the phase difference signal S40 and is available at the output of a subtractor 312 whose non-inverting input is supplied with the current reference signal $S_{REF}$ and whose inverting input is supplied with the phase difference signal S40. In the example illustrated, the phase difference signal S40 is directly supplied to the adder 311 and the subtractor 312. In this context, it shall be pointed out that the phase difference signal S40 available at the output of the phase discriminator arrangement (40 in FIG. 1) can still be scaled with a predefined scaling factor before it is supplied to the adder 311 and the subtractor 312. In the pulse width modulator arrangement 30 illustrated, the phase difference signal S40 determines the hysteresis interval, the following applying to the hysteresis interval value:

$$\Delta Hy = 2 \cdot S40 \quad (3a),$$

if the scaling factor used to scale the phase difference signal S40 is 1. Otherwise, the following applies more generally:

$$\Delta Hy = 2 \cdot a \cdot S40 \quad (3b),$$

where a denotes any desired scaling factor.

The pulse width modulator arrangement 30 illustrated in FIG. 10 uses a hysteresis regulating method to generate the pulse-width-modulated drive signal S30. As already explained in connection with FIG. 4, the frequency $f_{S30}$ of the pulse-width-modulated drive signal S30 is dependent on the hysteresis interval $\Delta Hy$ in the case of a hysteresis regulating method. The pulse width modulator arrangement 30 illustrated in FIG. 10 uses this dependence of the frequency of the pulse-width-modulated drive signal S30 on the hysteresis interval value $\Delta Hy$ to adjust the frequency and phase of the pulse-width-modulated drive signal S30 to the frequency and phase of the reference clock signal $S_{CLK}$ using the hysteresis interval value $\Delta Hy$. In the adjusted state and with a constant load and a constant upper signal level of the pulse-width-modulated voltage, the phase difference signal S40 assumes a constant value which determines the hysteresis interval $\Delta Hy$ and thus directly determines the frequency of the pulse-width-modulated drive signal S30. If the reference clock signal $S_{CLK}$ and the pulse-width-modulated drive signal S30 come out of phase, for example, because the reference clock signal $S_{REF}$, the load Z or the upper signal level of the pulse-width-modulated voltage V20 changes, the phase difference signal S40 is automatically adjusted over one or more drive cycles of the pulse-width-modulated drive signal S30 until the reference clock signal $S_{REF}$ and the pulse-width-modulated drive signal S30 are in phase again.

Since, in the pulse width modulator arrangement explained, the pulse-width-modulated drive signal S30 follows the reference clock signal $S_{REF}$ apart from in stabilization operations, electromagnetic interference radiation which is likewise influenced by the frequency of the reference clock signal $S_{REF}$ is produced in a current regulator having such a pulse width modulator arrangement 30. The power density spectrum of such electromagnetic interference radiation may be determined in advance, so that simpler and thus more cost-effective filters can be used to filter such electromagnetic interference radiation.

In a manner which has already been explained, in a hysteresis regulating method, the mean value of the current flowing through the load is not directly dependent on the current reference signal $S_{REF}$ if the load current I does not run in a linear manner between the limits predefined by the first and second hysteresis values Hy1, Hy2. However, such non-linearities can be taken into account in a particularly simple manner for the purpose of regulating the load current when the frequency at which the load current oscillates between the limit values is known.

Figure 11:
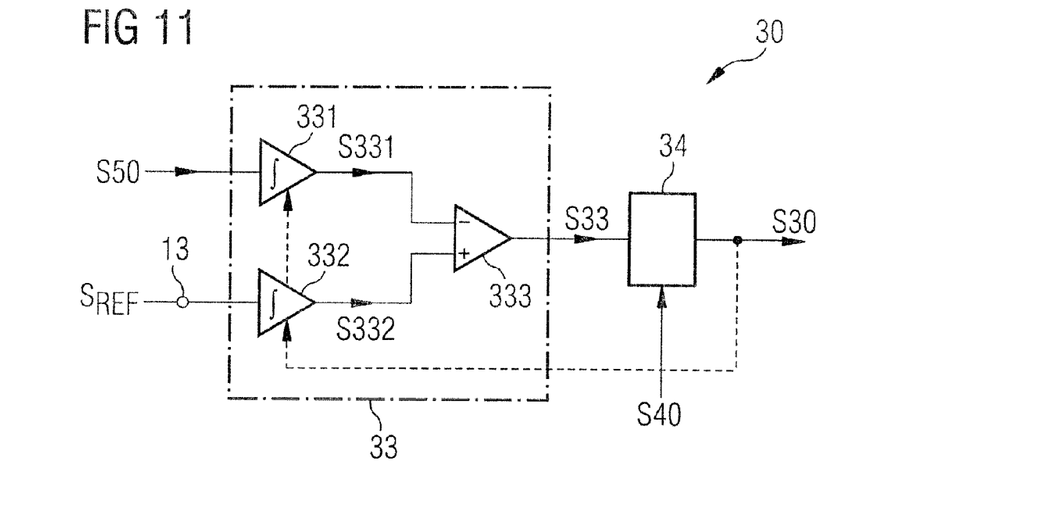
FIG. 11 shows a second example of a pulse width modulator arrangement.

FIG. 11 shows a block diagram of another example of a pulse width modulator arrangement 30 which is designed to generate the pulse-width-modulated drive signal S30 on the basis of the current measurement signal S50, the current reference signal $S_{REF}$ and the phase difference signal S40. This pulse width modulator arrangement 30 is suitable for generating the pulse-width-modulated drive signal S30 using an integrating regulating method and has an enable circuit 33 and a pulse width modulator 34 connected downstream of the enable circuit 33. The pulse-width-modulated drive signal S30 is available at the output of the pulse width modulator 34.

The enable circuit 33 is supplied with the current measurement signal S50 and the current reference signal $S_{REF}$. The enable circuit 33 is designed to generate an enable signal S33 on the basis of the current measurement signal S50 and the current reference signal $S_{REF}$, which enable signal is supplied to the pulse width modulator 34. Given a signal pulse of the enable signal S33, the pulse width modulator 34 is designed to generate an on level of the pulse-width-modulated drive signal S30 for a predefined on duration. In the pulse width modulator 34 illustrated, this on duration is dependent on the phase difference signal S40 which is likewise supplied to the pulse width modulator 34.

In the example illustrated, the enable circuit 33 has a first and a second integrator 331, 332. The first integrator 331 is supplied with the current measurement signal S50 and the second integrator 332 is supplied with the current reference signal $S_{REF}$. The integrators 331, 332 are designed to integrate the signals supplied to them over time. In this case, integrator output signals S331, S332 available at outputs of the integrators 331, 332 are supplied to inputs of a comparator 333 having an output at which the enable signal S33 is available. In the example illustrated, the output signal S332 of the second integrator 332 is supplied to a non-inverting input of the comparator 333, and the output signal S331 of the first integrator 331 is supplied to the inverting input of the comparator 333. Temporal profiles of these integrator output signals S331, S332 for a drive cycle are illustrated in FIG. 6C for the sake of better understanding. The pulse width modulator 34 illustrated in FIG. 11 is implemented, for example, in such a manner that it respectively generates an on level of the pulse-width-modulated drive signal S30 for the predefined on duration Ton upon a rising edge of the enable signal S33 available at the output of the comparator 333.

Figure 12:
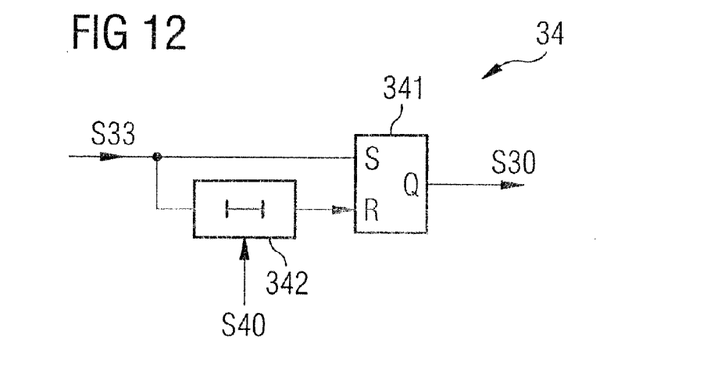
FIG. 12 illustrates a detail of the pulse width modulator arrangement according to FIG. 11.

With reference to FIG. 12, the pulse width modulator 34 comprises, for example, a flip-flop 341 having a set input and a reset input R and a delay element 342 having an adjustable delay time. The pulse-width-modulated drive signal S30 is available at an output, at a non-inverting output Q in the example, of this flip-flop 341. The enable signal S33 is supplied directly to the set input S of this flip-flop 341 and is supplied to the reset input R via the delay element 342. The flip-flop 341 is, for example, a flip-flop which is triggered by a positive edge and respectively generates an on level of the pulse-width-modulated drive signal S30 with a rising edge of the enable signal S33. The on level of the pulse-width-modulated drive signal is retained in this case until the flip-flop 341 is reset with a time delay via the delay element 342.

As already explained in connection with FIGS. 5 and 6, in an integrating regulating method, the frequency of the pulse-width-modulated drive signal S30 is dependent on the predefined on duration Ton. The pulse width modulator arrangement explained by way of example using FIGS. 10 and 11 uses this dependence of the frequency of the pulse-width-modulated drive signal S30 on the on duration Ton to regulate the frequency and phase of the pulse-width-modulated drive signal S30 to the frequency and phase of the reference clock signal $S_{REF}$. In this case, the phase difference signal S40 is used to set the on duration and, when a pulse width modulator according to FIG. 12 is used, is supplied to the delay element 342 in order to set the delay duration and thus to set the on duration.

A constant on duration is established given a constant current reference signal $S_{REF}$, a constant load and a constant upper signal level of the pulse-width-modulated voltage V20. If the reference clock signal $S_{REF}$ and the pulse-width-modulated drive signal S30 come out of phase, for example because the current reference signal $S_{REF}$, the load Z or the upper signal level of the pulse-width-modulated voltage V20 changes, the phase difference signal S40 and thus the on duration are adjusted until the reference clock signal $S_{REF}$ and the pulse-width-modulated drive signal S30 are in phase again.

Figure 13:
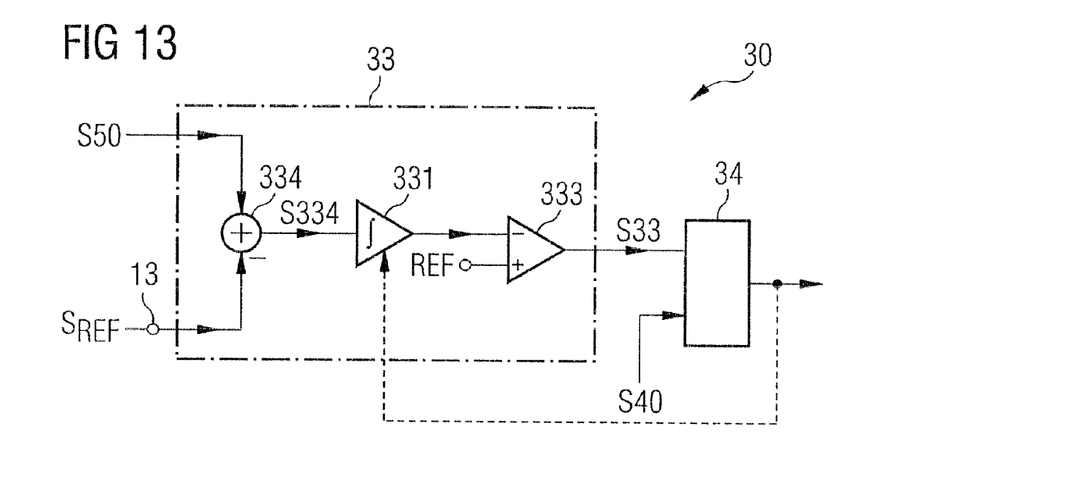
FIG. 13 shows another example of a pulse width modulator arrangement.

FIG. 13 shows a block diagram of another pulse width modulator arrangement 30 for generating a pulse-width-modulated drive signal S30 on the basis of the current measurement signal S50, the current reference signal $S_{REF}$ and the phase difference signal S40. This pulse width modulator arrangement 30 differs from the pulse width modulator arrangement 30 explained using FIG. 5 by virtue of the enable circuit 33. The pulse width modulator 34 used in the pulse width modulator arrangement 30 according to FIG. 13 may be, for example, a pulse width modulator 34 according to FIG. 12. In the enable circuit 33 according to FIG. 13, in contrast to the enable circuit 33 according to FIG. 11, a difference signal S334 is integrated using an integrator 331. The difference signal S334 corresponds to a difference between the current measurement signal S50 and the reference clock signal $S_{REF}$ and is available at the output of a subtractor 334 which is supplied with the current measurement signal S50 at a non-inverting input and with the current reference signal $S_{REF}$ at an inverting input. An output signal S331 of the integrator 331 is supplied to a comparator 333 which compares the integrator output signal S331 with a reference value REF, for example, zero. In the enable circuit according to FIG. 13, a rising edge of the enable signal S33 is respectively present when the time integral of the difference signal S334 falls below the reference value. With reference to FIG. 6C, this is synonymous with saying that the time integral of the current measurement signal S50 reaches the value of the time integral of the current reference signal $S_{REF}$ during an off duration.

The integrators 331, 332 used in the pulse width modulator arrangements 30 according to FIGS. 11 and 13 may be implemented, for example, in such a manner that they can be reset by the pulse-width-modulated drive signal S30, with the result that the integrators 331, 332 respectively integrate the signals supplied to them only during the duration of a drive cycle. These integrators 331, 332 are implemented, for example, in such a manner that they are respectively reset with a rising edge of the pulse-width-modulated drive signal S30.

What is claimed is:

1. A method for regulating a current through at least one inductive load, the method comprising:
    providing a reference clock signal and a reference current signal;
    applying a pulse-width-modulated supply voltage to an inductive load, applying comprising connecting terminals of the pulse-width modulated supply voltage across a series circuit comprising the inductive load in series with a switching element; and
    providing a current measurement signal that is dependent on a current flowing through the inductive load;
    wherein the pulse-width-modulated supply voltage is generated on the basis of the reference current signal, the current measurement signal and a phase difference signal that represents a phase difference between the reference clock signal and the pulse-width-modulated supply voltage.

2. The method as claimed in claim 1, wherein the pulse-width-modulated supply voltage has successive drive cycles and has a first voltage level during a drive cycle for a switched-on period and a second voltage level for a switched-off period following the switched-on period.

3. The method as claimed in claim 2, wherein the switched-on period begins when the current measurement signal reaches a first hysteresis value, and wherein the switched-on period ends and the switched-off period begins when the current measurement signal reaches a second hysteresis value, the first and second hysteresis values being dependent on the reference current signal and the phase difference signal.

4. The method as claimed in claim 3, wherein the first hysteresis value is dependent on a difference between the reference current signal and the phase difference signal, and wherein the second hysteresis value is dependent on a sum of the reference current signal and the phase difference signal.

5. The method as claimed in claim 1, wherein the pulse-width-modulated supply voltage is dependent on a time integral of the reference current signal and a time integral of the current measurement signal.

6. The method as claimed in claim 5,
    wherein the pulse-width-modulated supply voltage has successive drive cycles and has a first voltage level during a drive cycle for a switched-on period and a second voltage level for a switched-off period following the switched-on period,
    wherein the switched-on period begins when a difference between the time integral of the current measurement signal and the time integral of the reference current signal reaches a predefined value, and
    wherein a duration of the switched-on period is dependent on the phase difference signal.

7. The method as claimed in claim 6, wherein the predefined value is zero.

8. The method as claimed in claim 1, wherein the phase difference signal at a given time is dependent on a time integral of the phase difference for a period of time before the given time.

9. The method as claimed in claim 1, wherein the phase difference signal at a given time is dependent on a phase difference present at the given time.

10. The method as claimed in claim 1, wherein applying the pulse-width-modulated supply voltage to the inductive load further comprises:
    switching the switching element on and off in accordance with a pulse-width-modulated drive signal that is dependent on the reference current signal, the current measurement signal and the phase difference signal.

11. The method as claimed in claim 1, wherein:
the pulse-width-modulated supply voltage comprises a controllable voltage source comprising the terminals and a control connection; and
applying the pulse-width-modulated supply voltage to the inductive load further comprises
applying a pulse-width-modulated drive signal, which is dependent on the reference current signal, the current measurement signal and the phase difference signal, to the control connection of the controllable voltage source.

12. A current regulator comprising:
connecting terminals for connecting a load;
a first input terminal for receiving a reference clock signal and a second input terminal for receiving a reference current signal;
a controllable voltage source having load connecting terminals, which are connected to the connecting terminals, and a control input;
a current measuring arrangement that is designed to provide a current measurement signal that is dependent on a current flowing between the connecting terminals;
a pulse width modulator arrangement that is designed to generate a pulse-width-modulated drive signal for the control input of the controllable voltage source;
a phase discriminator arrangement that is supplied with the reference clock signal and the pulse-width-modulated drive signal and is designed to provide a phase difference signal that is dependent on a phase difference between the reference clock signal and the pulse-width-modulated drive signal; and
the pulse width modulator arrangement being designed to drive the pulse-width-modulated drive signal on the basis of this phase difference signal, the reference current signal and the current measurement signal.

13. The current regulator as claimed in claim 12,
wherein the pulse width modulator arrangement is designed to generate the pulse-width- modulated drive signal in such a manner that it has drive cycles and has a first signal level during a drive cycle for a switched-on period and a second signal level for a switched-off period following the switched-on period, and
wherein the pulse width modulator arrangement is designed to generate the first signal level of the pulse-width-modulated drive signal when the current measurement signal reaches a first hysteresis value and to generate the second signal level when the current measurement signal reaches a second hysteresis value, the first and second hysteresis values being dependent on the reference current signal and the phase difference signal.

14. The current regulator as claimed in claim 13, wherein the first hysteresis value is dependent on a difference between the reference current signal and the phase difference signal, and wherein the second hysteresis value is dependent on a sum of the reference current signal and the phase difference signal.

15. The current regulator as claimed in claim 12, wherein the pulse width modulator arrangement is designed to generate the pulse-width-modulated drive signal on the basis of a time integral of the reference current signal and a time integral of the current measurement signal.

16. The current regulator as claimed in claim 15, wherein the pulse width modulator arrangement is designed to generate the pulse-width-modulated drive signal in such a manner:
that it has successive drive cycles and it has a first signal level during a drive cycle for a switched-on period and a second signal level for a switched-off period following the switched-on period,
that a switched-on period respectively begins when a difference between the time integral of the current measurement signal and the time integral of the reference current signal reaches a predefined value, and
that a duration of the switched-on period is dependent on the phase difference signal.

17. The current regulator as claimed in claim 16, wherein the predefined value is zero.

18. The current regulator as claimed in claim 12, wherein the phase discriminator arrangement has a phase discriminator and a filter connected downstream of the phase discriminator.

19. The current regulator as claimed in claim 18, wherein the filter is a proportional-integral filter.

20. The current regulator as claimed in claim 12, wherein the controllable voltage source has a constant voltage source and a switching element that is connected in series with the constant voltage source and is driven by the pulse-width-modulated drive signal.

21. A current regulator comprising:
connecting terminals for connecting a load;
a first input terminal for supplying a reference clock signal and a second input terminal for supplying a reference current signal;
a controllable voltage source having load connecting terminals, which are connected to the connecting terminals, and a control input;
a current measuring arrangement that is designed to provide a current measurement signal that is dependent on a current flowing between the connecting terminals;
a pulse width modulator arrangement that is designed to generate a pulse-width-modulated drive signal for the control input of the controllable voltage source; and
a phase discriminator arrangement that is supplied with the reference clock signal and the pulse-width-modulated drive signal and is designed to provide a phase difference signal that is dependent on a phase difference between the reference clock signal and the pulse-width-modulated drive signal,
the pulse width modulator arrangement generates the pulse-width-modulated drive signal such that the pulse width modulated signal assumes a first signal level dependent on the phase difference signal.

22. A current regulator comprising:
connecting terminals for connecting a load;
a first input terminal for supplying a reference clock signal and a second input terminal for supplying a reference current signal;
a controllable voltage source having load connecting terminals, which are connected to the connecting terminals, and a control input;
a current measuring arrangement that is designed to provide a current measurement signal that is dependent on a current flowing between the connecting terminals;
a pulse width modulator arrangement that is designed to generate a pulse-width-modulated drive signal for the control input of the controllable voltage source; and
a phase discriminator arrangement that is supplied with the reference clock signal and the pulse-width-modulated drive signal and is designed to provide a phase difference signal that is dependent on a phase difference between the reference clock signal and the pulse-width-modulated drive signal, the pulse width modulator arrangement being designed to generate the pulse-width-modulated drive signal in such a manner that it assumes a first signal level when a difference between a time integral of the current measurement signal and a time integral of the reference current signal reaches a predefined value and it retains a first signal level for a period of time which is dependent on the phase difference signal.

23. The current regulator of claim 21, wherein the pulse width modulator arrangement generates the pulse-width-modulated drive signal in such that the pulse-width-modulated drive signal assumes a first signal level when the current measurement signal reaches a first hysteresis value and assumes a second signal level when the current measurement signal reaches a second hysteresis value, the first and second hysteresis values being dependent on the phase difference signal.

24. The current regulator of claim 21, wherein the pulse width modulator arrangement generates the pulse-width-modulated drive signal such that the pulse-width-modulated drive signal assumes a first signal level when a difference between a time integral of the current measurement signal and a time integral of the reference current signal reaches a predefined value and the pulse-width-modulated drive signal retains a first signal level for a period of time that is dependent on the phase difference signal.

25. A method for regulating a current through at least one inductive load, the method comprising:

providing a reference clock signal and a reference current signal;

applying a pulse-width-modulated supply voltage to an inductive load; and providing a current measurement signal that is dependent on a current flowing through the inductive load, wherein:
  the pulse-width-modulated supply voltage is generated on the basis of the reference current signal, the current measurement signal and a phase difference signal that represents a phase difference between the reference clock signal and the pulse-width-modulated supply voltage,
  the pulse-width-modulated supply voltage is dependent on a time integral of the reference current signal and a time integral of the current measurement signal,
  the pulse-width-modulated supply voltage has successive drive cycles and has a first voltage level during a drive cycle for a switched-on period and a second voltage level for a switched-off period following the switched-on period,
  the switched-on period begins when a difference between the time integral of the current measurement signal and the time integral of the reference current signal reaches a predefined value, and
  a duration of the switched-on period is dependent on the phase difference signal.

* * * * *